US007729805B2

(12) United States Patent
Katsumata

(10) Patent No.: US 7,729,805 B2
(45) Date of Patent: Jun. 1, 2010

(54) TRAVEL TIME DISPLAY DEVICE AND METHOD FOR INDUSTRIAL ROBOT

(75) Inventor: Kazuhiro Katsumata, Gotemba (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 1280 days.

(21) Appl. No.: 11/192,027

(22) Filed: Jul. 29, 2005

(65) Prior Publication Data
US 2006/0025889 A1 Feb. 2, 2006

(30) Foreign Application Priority Data
Jul. 30, 2004 (JP) ............................. 2004-223472

(51) Int. Cl.
*G05B 19/416* (2006.01)
*G05B 23/00* (2006.01)
(52) U.S. Cl. .................... 700/264; 700/97; 700/245; 901/50; 318/568.18; 318/568.25; 701/25
(58) Field of Classification Search ................. 701/25; 700/254; 901/50; 318/568.25
See application file for complete search history.

(56) References Cited

U.S. PATENT DOCUMENTS

| 5,655,060 A * | 8/1997 | Lucas ........................... 700/250 |
| 6,092,004 A * | 7/2000 | Harima ......................... 700/252 |
| 6,933,860 B1 * | 8/2005 | Gehman .................... 340/995.1 |
| 2004/0068352 A1 * | 4/2004 | Anderson ..................... 701/25 |

FOREIGN PATENT DOCUMENTS

| GB | 2389290 A | 5/2002 |
| JP | 05-101036 A | 4/1993 |
| JP | 2001-071287 | 3/2001 |
| JP | 2003-103491 A | 4/2003 |

OTHER PUBLICATIONS

Zvi Shiller, "Interactive Time Optimal Robot Motion Planning and Work-Cell Layout Design", IEEE 1989, pp. 964-969.*
Gideon Sahar, John M. Hollerbach, "Planning of Minimum-Time Trajectories for Robot Arms", Massachusetts Institute of Technology, Artificial Intelligence Laboratory, A.I. Memo No. 804, Nov. 1984. pp. 1-24.*
Joseph K. erry, Bridging GIS and Map Analysis: Identifying and Utilizing Spatial Relationships, Paper fro ASPRS Annual Conference, May 23-28, 2004, Denver Colorado.*

* cited by examiner

*Primary Examiner*—Thomas G Black
*Assistant Examiner*—Lin B Olsen
(74) *Attorney, Agent, or Firm*—Pillsbury Winthrop Shaw Pittman LLP

(57) ABSTRACT

There is provided a travel time display device for an industrial robot which can display travel time on the screen such that time taken for moving a work from any designated starting point to any other point can be seen at a glance. The travel time display device includes: a display for displaying on the screen the location of the industrial robot and an area in which the industrial robot can transport the work; a position designator for designating a travel starting point of the industrial robot at an arbitrary position on the display screen; a calculator for setting a plurality of time intervals with respect to necessary travel time from the travel starting point and calculating a travelable area, to be displayed on the display screen; and a display for depicting the travelable areas with a visual discrimination between the travelable areas.

12 Claims, 8 Drawing Sheets

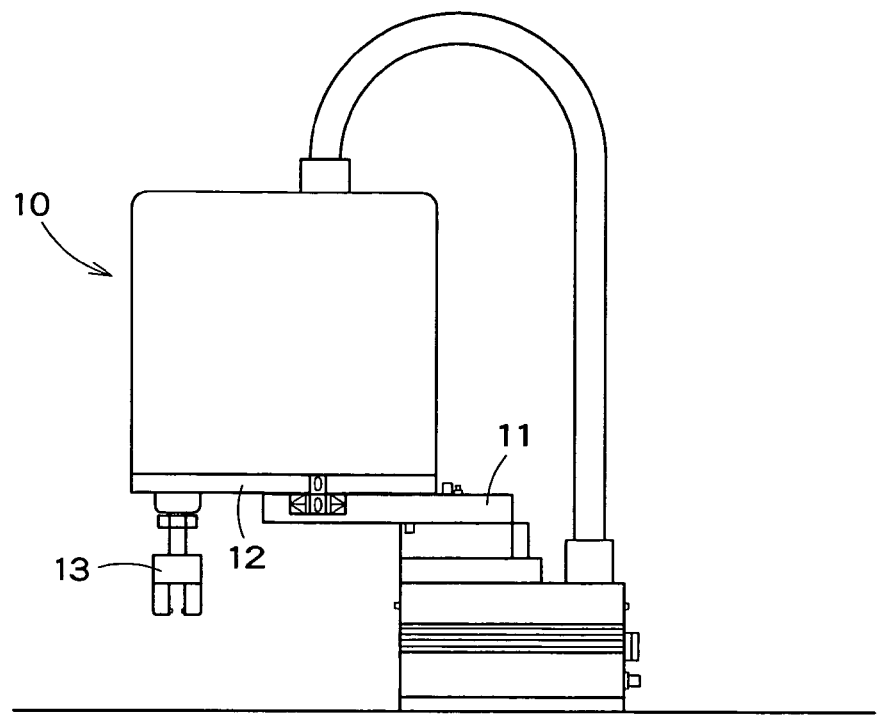
F I G. 1
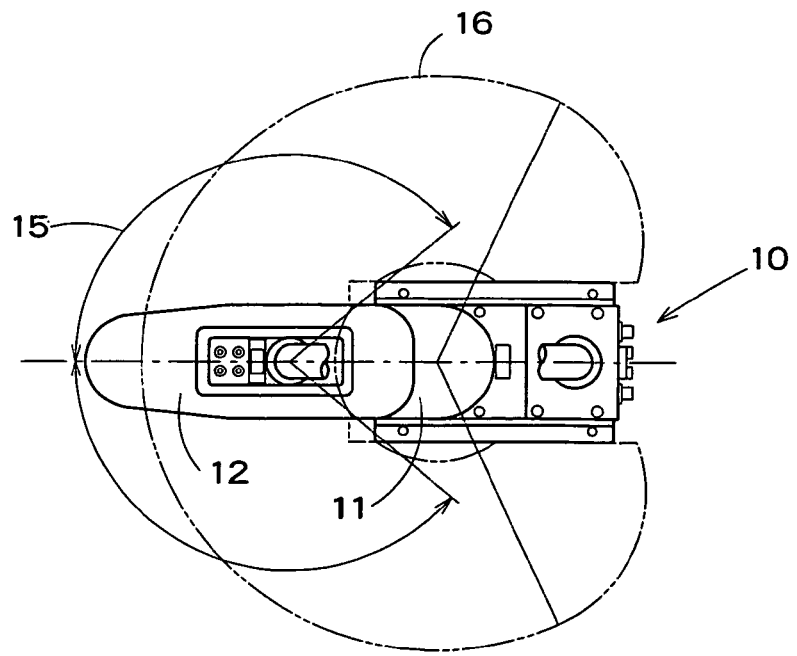
F I G. 2

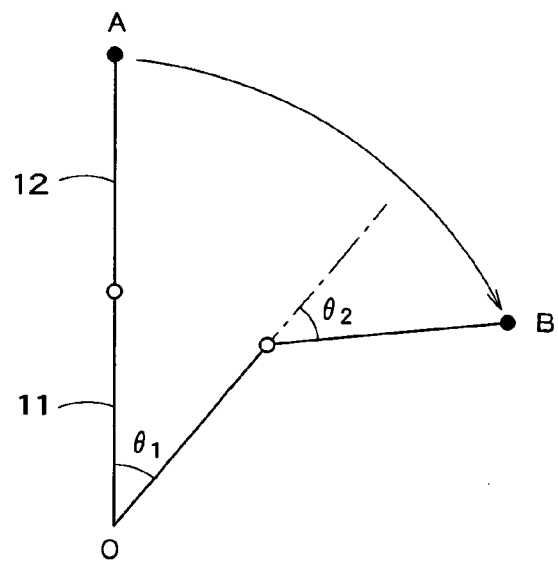
F I G. 9
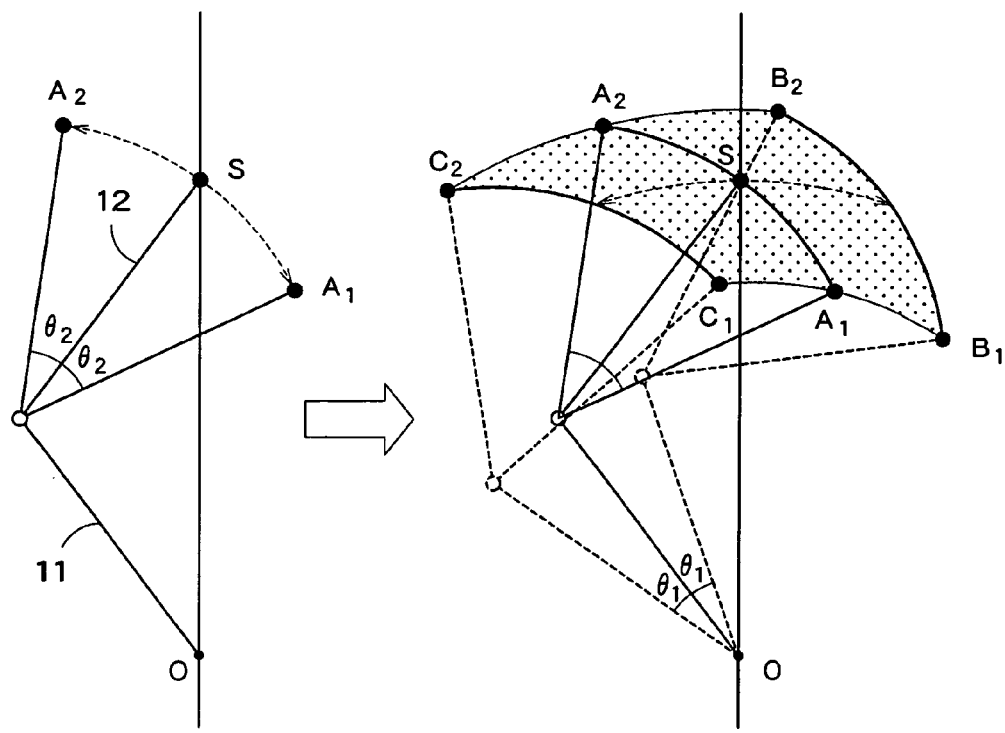
F I G. 10A        F I G. 10B

TRAVEL TIME DISPLAY DEVICE AND METHOD FOR INDUSTRIAL ROBOT

CROSS-REFERENCE TO RELATED APPLICATIONS

This application claims priority to Japanese Patent Application No. 2004-223472, filed Jul. 30, 2004, the entire contents of which is incorporated herein by reference.

BACKGROUND OF THE INVENTION

1. Field of the Invention

The present invention relates to an industrial robot for use in work transportation, and more particularly to a system for graphically displaying time taken for an industrial robot to move a work from an arbitrary travel starting point.

2. Background Art

Industrial robots are increasingly introduced into factories these days for transportation of products and works. The typical usage of industrial robots is transportation, and a common industrial robot for transportation holds a product or a work with an end effector and transports it from a starting point to an objective point. When planning a work transportation by means of an industrial robot, it is necessary to determine a starting point and an objective point and, in addition, a transport route between the starting point and the objective point.

The determination of starting point and objective point in work transportation by means of an industrial robot, in most cases, has been made in a rough manner. For instance, after designating the position of a belt conveyor and determining the point of arrival of a work, the starting and objective points are roughly determined accordingly.

On the other hand, an industrial robot needs to be instructed of a work traveling route, and setting and change of a transport route generally requires a time-consuming processing. An industrial robot has therefore been proposed which enables a simple processing for the setting of transport route, as disclosed in Japanese Patent Laid-Open Publication No. 2001-71287. According to the conventional technique, the setting of transport route with the shortest traveling route can be made by simply moving or stopping an end effector and inputting the position from a teaching box.

In transportation by a robot, there is a case in which with the same distance between starting point and objective point, a difference in the operating time of the robot in transportation, and thus a difference in the transport time, can be produced by a difference in the position of starting point or objective point. Thus, the transport efficiency can be high or low depending upon how to select the positions of starting and objective points even when the transport distance is the same.

In the setting of work transport route for a conventional industrial robot, technical attention has been paid exclusively to how to set traveling route rather than how to determine starting and objective points. Accordingly, technical approach has not yet been made to, for example, a method for determining appropriate starting and objective points from the viewpoint of enhancing transport efficiency.

SUMMARY OF THE INVENTION

The present invention has been made in view of the above situation in the background art. It is therefore an object of the present invention to provide a travel time display device and method for an industrial robot which can display travel time on the screen in such a manner that time taken for moving a work from any designated starting point to any other point can be seen at a glance, so that the display can be effectively utilized as information for determining a starting point and an objective point from the standpoint of transport efficiency.

In order to achieve the object, the present invention provides a travel time display device for displaying, by a computer system, time taken for an industrial robot to move a work between two points, comprising: a display for displaying on the screen the location of the industrial robot and an area in which the industrial robot can transport the work; a position designation means for designating a travel starting point of the industrial robot at an arbitrary position on the display screen; a calculation means for setting a plurality of divisions at intervals of a predetermined time with respect to necessary travel time from the travel starting point and calculating a travelable area to be displayed on the display screen for each of the necessary travel time divisions; and a display means for depicting the travelable areas on the display screen with a visual expression discriminating between the travelable areas.

The present invention also provides a control system for controlling, by a computer system, an industrial robot having a travel time display function, comprising: a robot control device for controlling the operation of the industrial robot; a display for displaying on the screen the location of the industrial robot and an area in which the industrial robot can transport a work; a position designation means for designating a travel starting point of the industrial robot at an arbitrary position on the display screen; a calculation means for setting a plurality of divisions at intervals of a predetermined time with respect to necessary travel time from the travel starting point and calculating a travelable area to be displayed on the display screen for each of the necessary travel time divisions; a display means for depicting the travelable areas on the display screen with a visual expression discriminating between the travlable areas; and a communication means for transmitting necessary data between the robot control device and the calculation means.

The present invention further provides a recording medium storing a travel time display program for displaying, by a computer system, time taken for an industrial robot to move a work between two points, said program executing a computer process comprising: displaying on a display screen an area in which the industrial robot can transport the work; setting a plurality of divisions at intervals of a predetermined time with respect to necessary travel time from a travel starting point, designated at an arbitrary position on the display screen, of the industrial robot; calculating a travelable area to be displayed on the display screen for each of the necessary travel time divisions; and depicting the travelable areas on the display screen with a visual expression discriminating between the travelable areas.

According to the present invention, work transport time can be displayed on a screen in such a manner that how much time is taken for moving a work from a travel starting point S to any objective point is obvious at a glance. The present invention thus provides a simulation tool that will be of much help in determining a travel starting point and an objective point from the standpoint of transport efficiency in making a plan of work transportation by an industrial robot.

BRIEF DESCRIPTION OF THE DRAWINGS

FIG. 1 is a side view of an industrial robot to which the present invention can be applied;

FIG. 2 is a plan view of the industrial robot;

FIG. 9 is a diagram schematically showing the robot arm of the industrial robot shown in FIG. 1;

FIGS. 10A and 10B are diagrams illustrating a method for calculating travelable areas according to a second embodiment of the present invention;

DETAILED DESCRIPTION OF THE PREFERRED EMBODIMENTS

Figure 3:
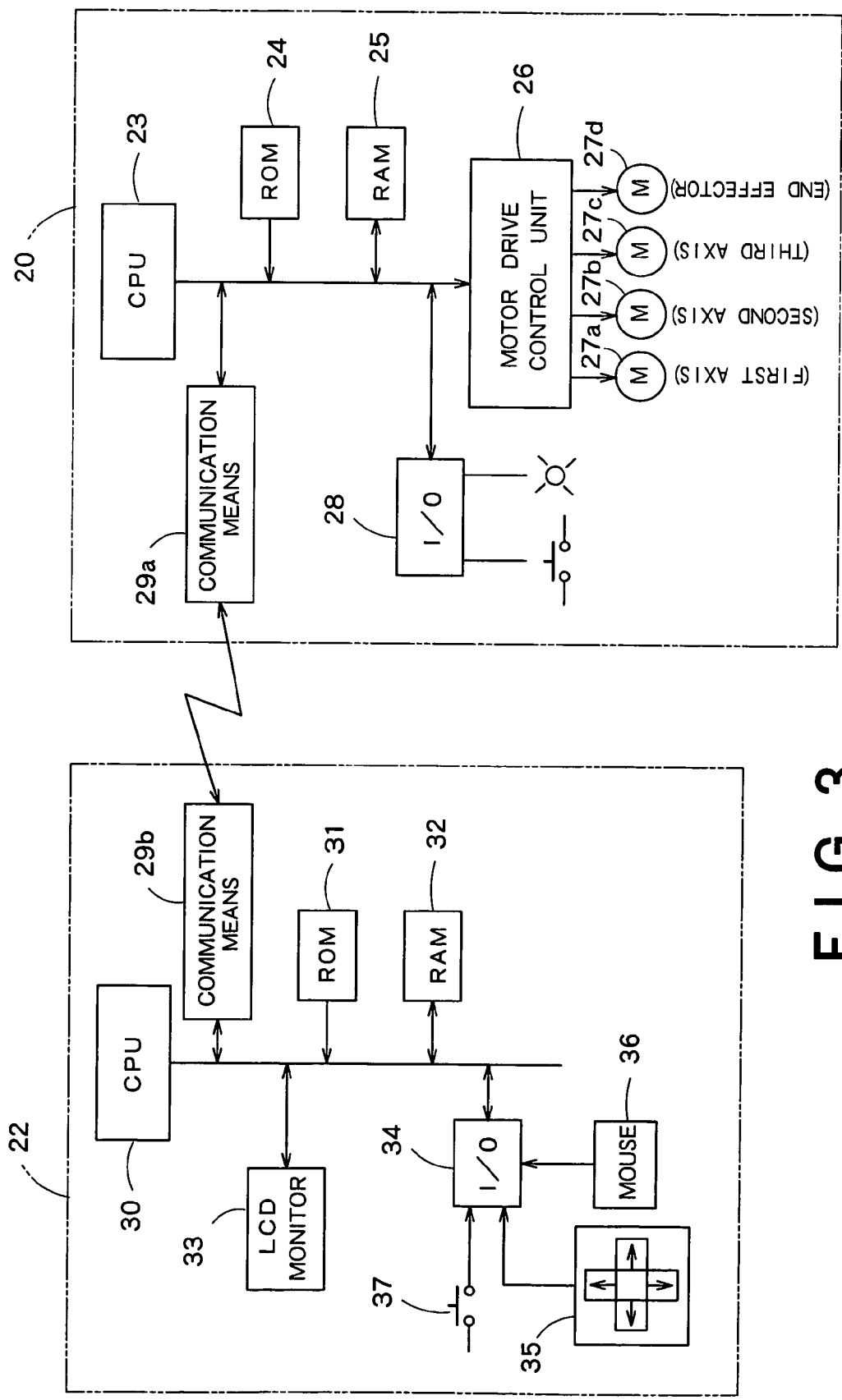
FIG. 3 is a block diagram showing a control system for the industrial robot incorporating a travel time display device according to the present invention.

Preferred embodiments of the present invention will now be described with reference to the drawings.

First Embodiment

FIG. 1 is a side view of an industrial robot to which the present invention can be applied, and FIG. 2 is a plan view of the industrial robot of FIG. 1. In FIGS. 1 and 2, reference numeral 10 denotes the entirety of the industrial robot. The robot arm of the industrial robot is comprised of a first pivot arm 11 and a second pivot arm 12, and an end effector for clamping a work is mounted to the second pivot arm 12. The industrial robot 10 has a first shaft and a second shaft respectively for pivoting the first pivot arm 11 and the second pivot arm 12 in a horizontal plane, and a third shaft for vertically moving the end effector 13. In FIG. 2, the range surrounded by the curve 15 corresponds to the pivoting range of the second pivot arm 12. The overall traveling range, determined by the traveling ranges of the first and second pivot arms, corresponds to the range surrounded by the curve 16.

FIG. 3 is a block diagram showing a control system for the industrial robot of FIG. 1 incorporating a travel time display device according to the present invention. In FIG. 3, reference numeral 20 denotes the entirety of a robot controller as a control device for the industrial robot, and reference numeral 22 denotes a travel time display device. The robot controller 20 includes a central processing unit 23, a ROM 24 storing a program for robot control, a RAM 25 for temporarily storing data, a motor drive control section 26, and a digital input/output section 28 to which are connected various switches. Based on a command from the central processing unit 23, the motor drive control section 26 controls a servomotor 27a for driving the first shaft, a servomotor 27b for driving the second shaft, a servomotor 27c for driving the third shaft, and a servomotor 27d for driving the end effector.

According to this embodiment, the travel time display device 22 employs a system construction which uses a personal computer connected to the robot controller 20 by communication means 29a, 29b comprised of serial data transfer means such as RC232C, and sends and receives necessary data to and from the robot controller 20. The travel time display device 22 comprises, as basic components, a central processing unit 30, a ROM 31 storing various programs for travel time display, a RAM 32 for temporarily storing data changing with control and display calculation and data on flags for control, a display 33 comprised of an LCD monitor, and a digital input/output section 34. To the digital input/output section 34 are connected an arrow key 35 for moving and positioning a cursor on the screen of the display 33, a mouse 36, and a push-button switch 37 for use in the setting of travel starting position. The programs written in the ROM 31 include a program for calculating distance and traveling area for travel time display, a program for depicting traveling areas with a colored pattern, a program for communication control, etc.

The basic idea of travel time display according to the present invention will now be described with reference to FIG. 4.

Figure 4:
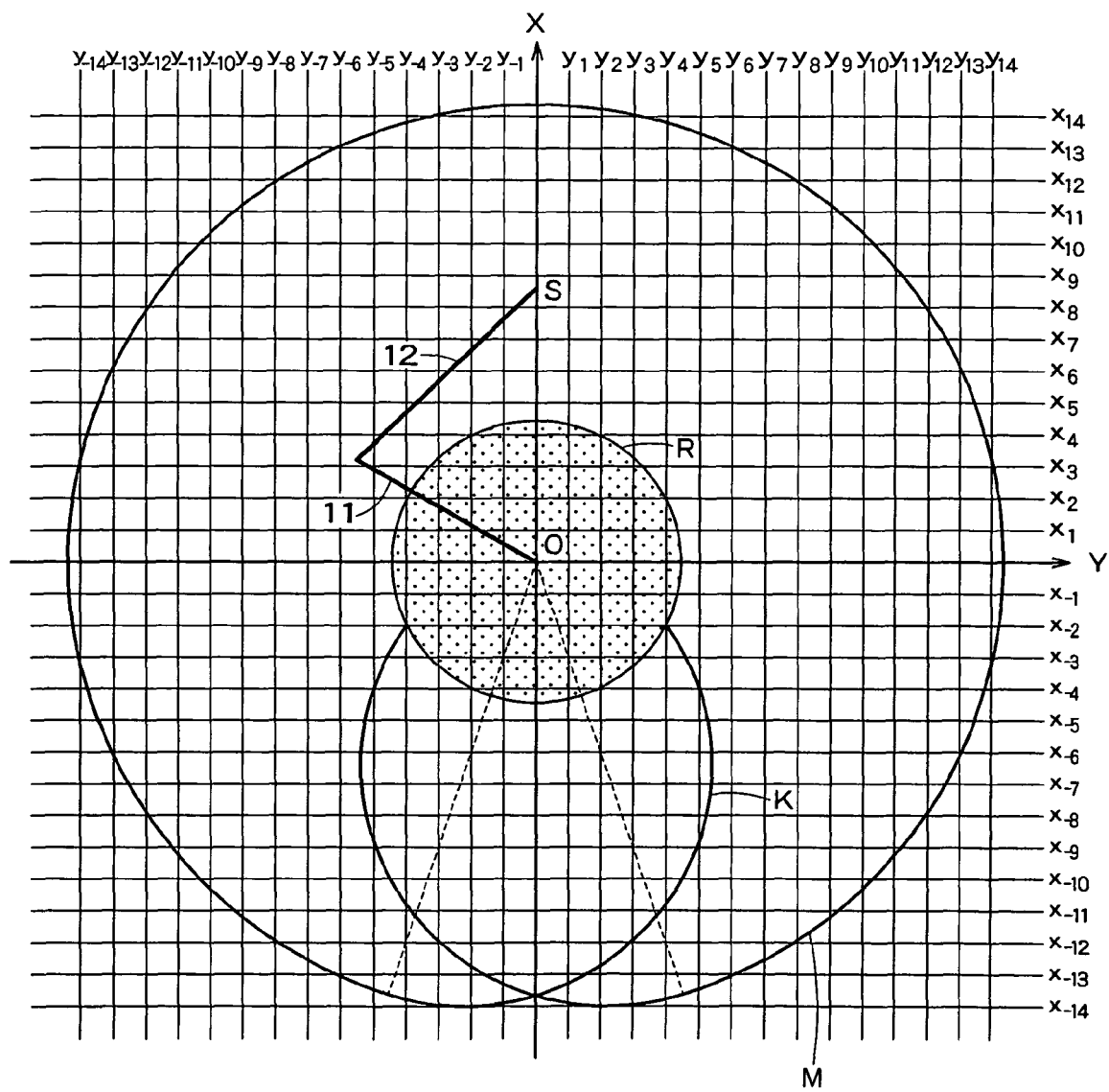
FIG. 4 is a diagram illustrating the basic idea of travel time display according to a first embodiment of the present invention.

As shown in FIG. 4, a coordinate system with X-axis and Y-axis is taken for the operation area of an industrial robot. The position O represents the coordinate origin. The circular area R with the coordinate origin O as the center is the installation area of the industrial robot, the center of operation of the industrial robot coinciding with the coordinate origin O. The blind area K corresponds to the blind spot behind the industrial robot. The operation area M of the industrial robot corresponds to the circular area with the coordinate origin O as the center and within the maximum arm radius, from which the installation area R and the blind area K are excluded.

In order to divide the operation area M in a grid pattern, horizontal grid lines xi parallel to the Y-axis and vertical grid lines yi parallel to the X-axis are drawn, thereby dividing the operation area M into a large number of rectangular unit areas Cij.

Next, a travel starting point S of the industrial robot is set. The travel starting point S may be any point insofar as it lies within the operation area M. Assuming that the travel starting point S is set at the position shown in FIG. 4, travel time from the travel starting point S to an arbitrary objective point is calculated. In carrying out calculation, the following conditions are set by way of example.

Work Traveling Conditions:

(1) The end effector travels on the straight line connecting the travel starting point S and an objective point.

(2) The traveling velocity of the end effector is constant.

Thereafter, in FIG. 4, a traveling area in which the end effector travels within 0.1 second from the travel starting point S painted, for example, in red, a traveling area to which the end effector travels in 0.1 to 0.2 second is painted in a color having a different tone from red, for example, yellow, and the following similarly-divided traveling areas may be painted in different colors. By thus displaying different traveling areas with a visually discriminating expression using different colors, the time taken from the end effector to travel from the travel starting point S to an arbitrary objective point can be seen at a glance.

A description will now be given of the operation of the control system for the industrial robot of FIG. 3 incorporating the travel time display device of this embodiment by referring to the flow chart of a program for travel time display shown in FIG. 5.

First, the arrow key 35 or the mouse 36 is manipulated to move the cursor on the screen of the display 33 and place the cursor in an arbitrary position to be set as a travel starting point S on the screen. By pressing the push-button switch 37, the cursor position is read as the coordinates of the travel starting point S into the central processing unit 30 (step S10).

Next, calculation of travel distance and travel time from the travel starting point S is carried out for all the rectangular unit areas Cij in the central processing unit 30 (step S11).

Figure 6:
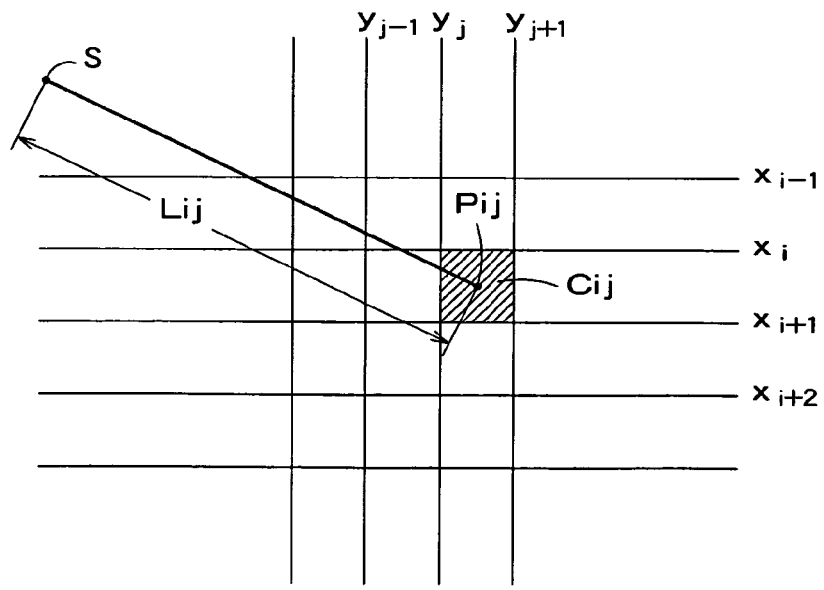
FIG. 6 is a diagram illustrating the distance from a travel starting point to a rectangular unit area.

In particular, in FIG. 6, the distance Lij represents the shortest distance from the travel starting point S to the central point Pij of an arbitrary rectangular unit area Cij. When using the symbol v for the traveling velocity of the end effector 13 (constant velocity), and the symbol Tij for the necessary travel time taken for the end effector to travel from the travel starting point S to the rectangular unit area Cij (central point Pij), the following equation hols true:

$$Tij=Lij/v$$

Thus, the necessary travel time Tij from the travel starting point S can be calculated with ease for all the rectangular unit areas Cij.

In the subsequent step S12, with respect to necessary travel time Tij from the travel starting point S, divisions are set at intervals of a predetermined time, and a decision is made as to which necessary travel time division a particular necessary travel time Tij, i.e. necessary travel time from the travel starting pint S to a particular rectangular unit area Cij, belongs to. For example, necessary travel time divisions are set at intervals of 0.1 second, as follows: division 1 (0-0.1 second), division 2 (0.1-0.2 second), division 3 (0.2-0.3 second), division 4 (0.3-0.4 second), and so forth. A decision as to which division a particular necessary travel time Tij from the travel starting point S belongs to is made for all the rectangular unit areas Cij.

In the subsequent step S13, all the rectangular unit areas are displayed on the screen of the display 30 with a color pattern of various colors, using the same color for rectangular unit areas belonging to the same necessary travel time division, for example, as follows: red for rectangular unit areas belonging to division 1; ocher for rectangular unit areas belonging to division 2; yellow green for rectangular unit areas belonging to division 3; green for division 4; light blue for division 5; and so forth. Rectangular unit areas belonging to the same travel time division can thus be specified as belonging to the same travelable area.

Figure 7:
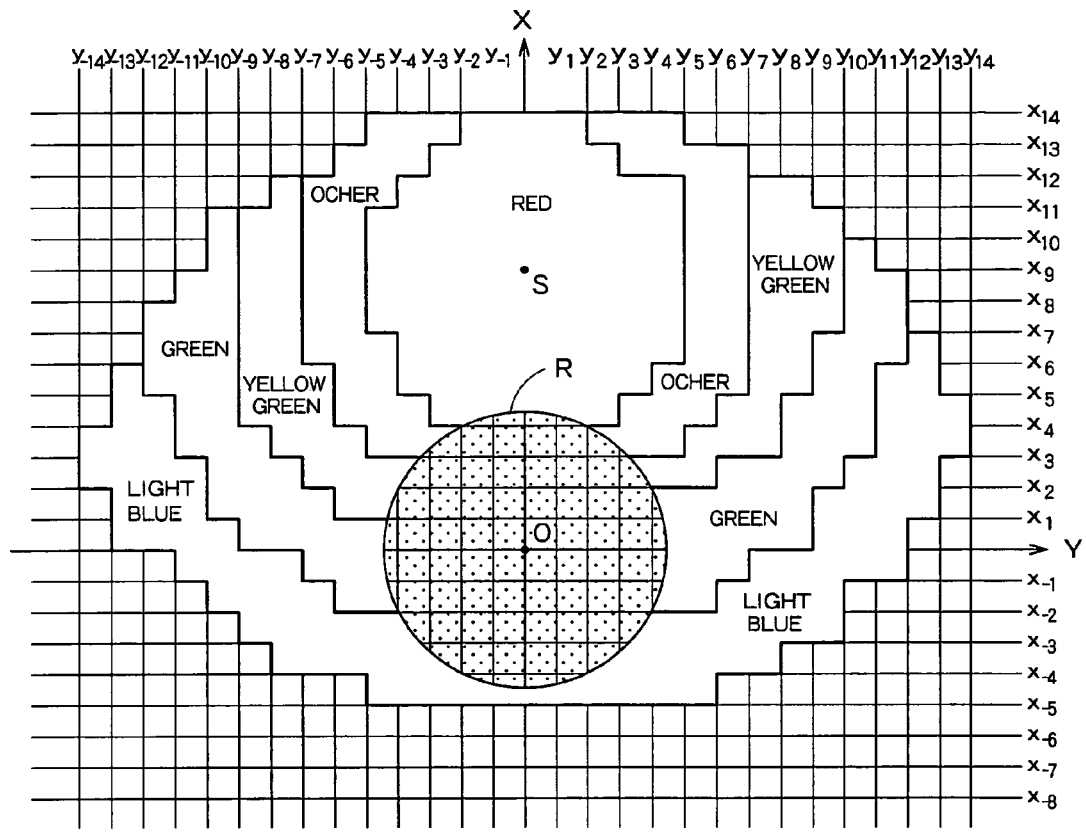
FIG. 7 is a diagram showing a display example of travel time display according to the first embodiment.

FIG. 7 shows the display example displayed on the screen. As indicated in FIG. 7, the area in which the end effector can travel within 0.1 second from the travel starting point S is painted in red, the area to which the end effector can travel in 0.1 to 0.2 second is painted in ocher, the area travelable in 0.2 to 0.3 second is painted in yellow green, the area travelable in 0.3 to 0.4 second is painted in green, and the area travelable in 0.4 to 0.5 second is painted in light blue. Though the color variation in the color pattern, in which the color tone of travelable area gradually changes like a rainbow from red tone to blue tone as the distance from the travel starting point S increases, is not shown in a graphical or visual manner in FIG. 7, it will be displayed graphically on the actual screen of the display 33.

With such a color-pattern display, one can see at a glance how much time is taken for moving a work from the travel starting point S to any objective point. The display software can thus fulfill a simulation function that will be of much help in determining a starting point and an objective point for work transportation.

According to this embodiment, the operation area is divided into rectangular unit areas in a grid pattern, and the density of the color pattern on the display screen can vary depending on the degree of division. In this regard, the use of the CPU exclusive for display calculation processing, which is provided separately from the CPU of the robot controller, can respond to a high-density color pattern and provide a sufficiently high resolution to obtain information for estimating transport efficiency.

Figure 8:
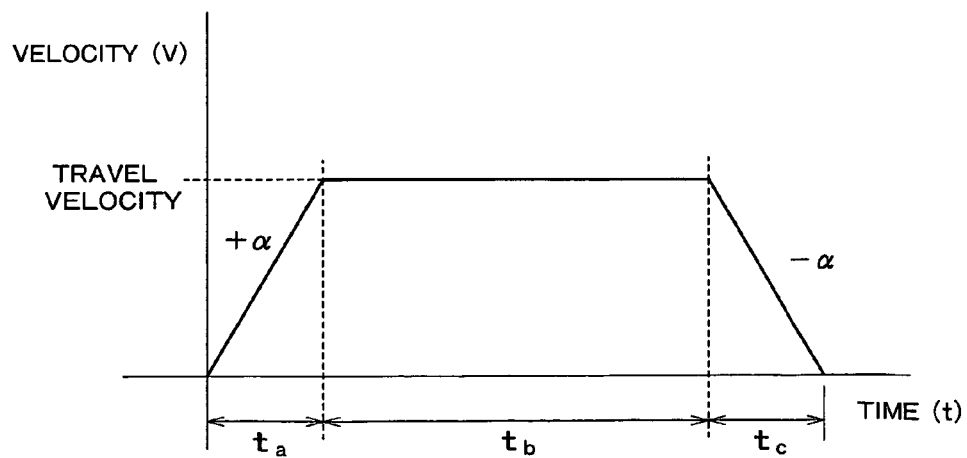
FIG. 8 is a diagram showing a preset pattern of velocity change to be considered upon calculation of travel time.

According to this embodiment, the travel time calculation in step S11 is carried out with the traveling velocity constant. Apart from this, when a pattern of velocity change, including acceleration α, acceleration time ta, constant-velocity time tb, deceleration time tc, etc., is preset, as shown in FIG. 8, the travel time may be calculated taking the preset velocity change into consideration.

Figure 5:
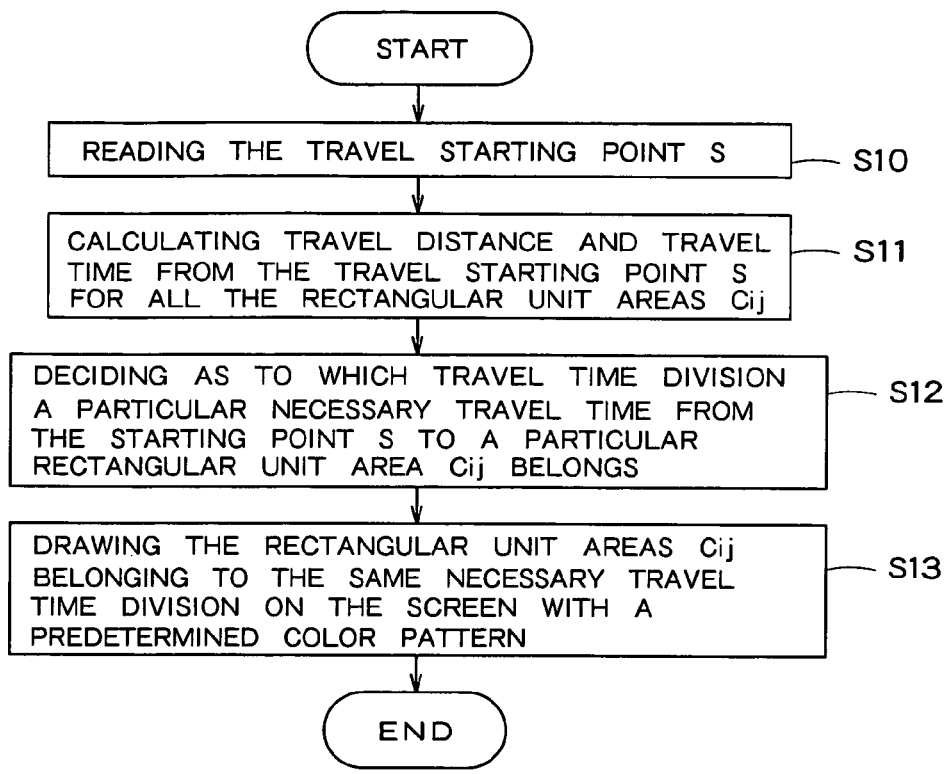
FIG. 5 is flow chart of a program for travel time display according to the first embodiment.

Further, according to this embodiment, the position of the cursor is taken as the coordinates of travel starting point S by pressing the push-button switch 37 in step S10 of the flow chart of FIG. 5 before starting the display calculation of step S11, as described above. Instead of this, it is also possible to carry out the display calculation processing of step S11 immediately after taking the coordinates of the present cursor positions in a consecutive manner and dynamically change the display on the screen following the movement of the cursor. Though the use of a high-speed CPU is necessary to carry out the calculation processing, the processing for depicting a color pattern can follow the movement of cursor, thus eliminating the need of the operation for setting travel starting points and offering a high practical utility.

Second Embodiment

The second embodiment intends to determine the travelable area of the articulated industrial robot of FIG. 1 from the travel distances of the respective shafts and according to the operations of the shafts.

FIG. 9 is a diagram schematically showing the robot arm of the industrial robot shown in FIG. 1. The basic idea of travel time display according to the second embodiment is described at the outset with reference to FIG. 9.

Work Traveling Conditions:

(1) The end effector travels from a travel starting point to an objective point through the pivot movements of the first shaft and the second shaft, and does not always travel the shortest distance between the travel starting point and the objective point.

(2) The pivoting velocities of the first axis and the second axis are constant.

According to the second embodiment, a position in the operation area of the industrial robot can be specified in a polar coordinate system. In FIG. 9, the position O indicates the coordinate origin. The robot arm is comprised of the first pivot arm 11 and the second pivot arm 12, and the center of rotation of the first shaft that pivots the first pivot arm, lies on the coordinate origin O. The point A is taken for a travel starting point, and the point B for an objective point. The end effector can be moved from point A to point B by pivoting the first shaft through angle θ1 and pivoting the second shaft through angle θ2. Accordingly, after determining the necessary times for pivoting the first and second shafts through the pivot angles θ1 and θ2, respectively, the longer time gives the travel time from point A to point B.

Travel time can be determined in this manner when a travel starting and an objective point are determined. Similarly, the pivot angle of the first shaft and the pivot angle of the second shaft can be determined when a particular travel time, for example one second, is predetermined. Therefore, the position of the end effector can also be determined by calculation.

Consider now the travelable area of the end effector, taking θ1 and θ2 for the pivot angles of the first and second shafts, operable in a unit time t, and point S for a travel starting point in FIG. 10.

First, consider the case where only the second shaft operates and pivots θ2 right and left, so that the end effector travels to positions A1 and A2, respectively, as shown in FIG. 10A. In this case, the end effector travels on the arc A1A2 in unit time t.

Next, consider the case where the first shaft pivots θ1 right and left, as shown in FIG. 10B. Assuming that the end effector is in the position A1, it travels to position B1 when the first shaft pivots θ1 clockwise. If the end effector is in the position A2, it travels to position B2 by the same movement of the first shaft. Further, if the end effector lies on the arc A1A2, it travels onto the arc B1B2.

It will be understood that since the first shaft and the second shaft operate simultaneously, the end effector will lie within the area surrounded by A1, A2, B1 and B in 0-t second. Similarly, when the first shaft pivots θ1 counterclockwise, the end effector will lie within the area surrounded by A1, A2, C1 and C2 in 0-t second. A later position of the end effector until elapse of the next unit time t, i.e. in t-2t second, can be determined in the same manner.

By displaying different travelable areas, such as, an area in which the end effector can travel within 0.1 second, an area to which the end effector can travel in 0.1 to 0.2 second, and so forth, with a visually discriminating expression using different colors, the time taken for the end effector to travel from the travel starting point S to an arbitrary objective point can be seen at a glance.

Figure 11:
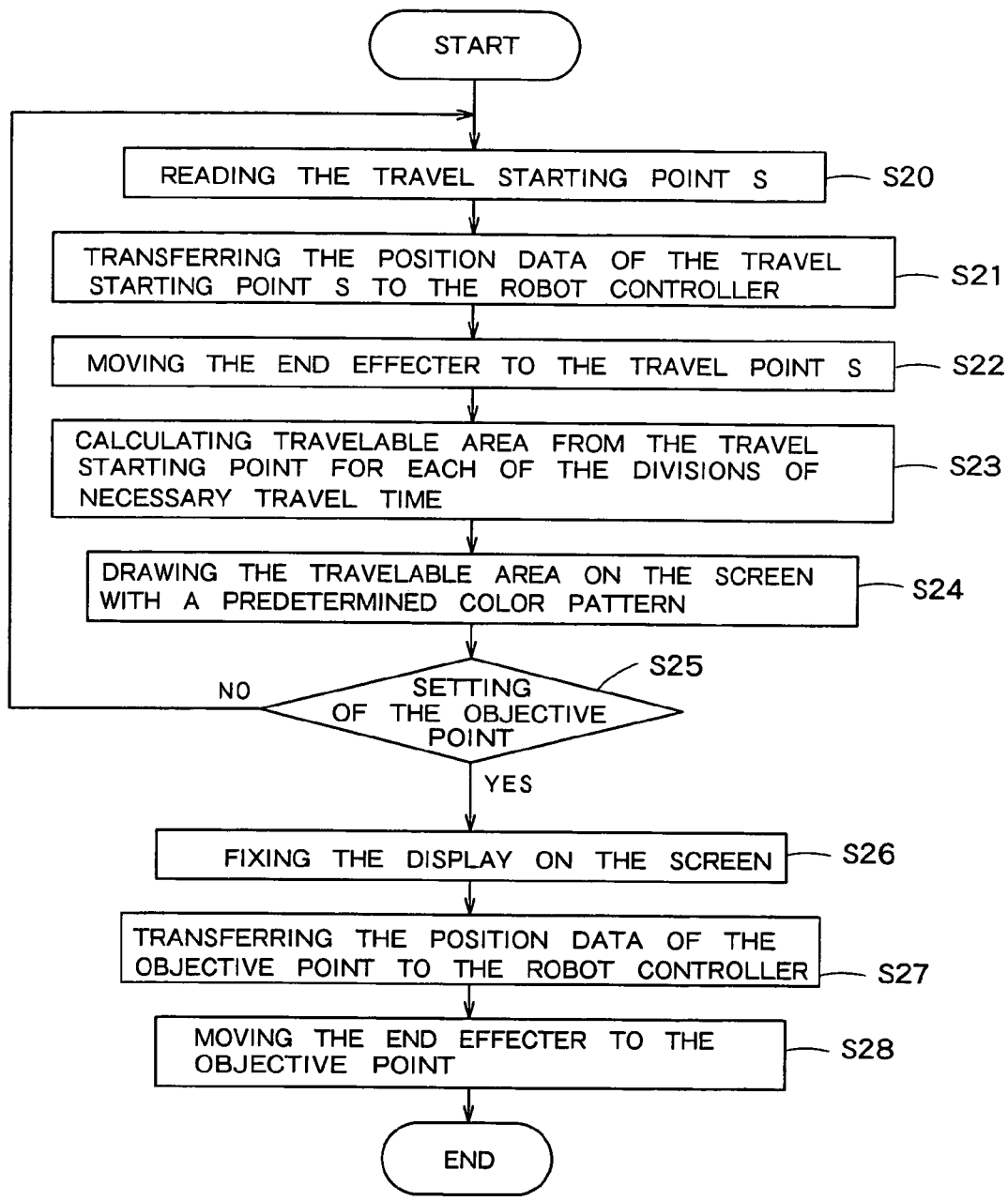
FIG. 11 is a flow chart of a program for travel time display according to the second embodiment.

A description will now be given of the operation of the control system for the industrial robot of FIG. 3 incorporating the travel time display device of this embodiment, by referring to the flow chart of a program for travel time display shown in FIG. 11.

First, the arrow key 35 or the mouse 36 is manipulated to move the cursor on the screen of the display 33 and place the cursor in an arbitrary position to be set as a travel starting point S on the screen. By pressing the push-button switch 37, the cursor position is read as the coordinates of the travel starting point S into the central processing unit 30 (step S20).

Upon designation of the travel starting point S, the position data is transferred to the robot controller 20 by means of the RS232C as the communication means 29a, 29b (step S21). In order to move the end effector 13 to the designated travel starting point S, the central processing unit 23 sends a command to the motor drive control section 26 (step S21), and the end effector travels to the actual travel starting point S (step S22).

Next, for each of the divisions of necessary travel time from the travel starting point S, such as, division 1 (0-0.1 second), division 2 (0.1-0.2 second), division 3 (0.2-0.3 second), division 4 (0.3-0.4 second), and so forth, i.e. set at intervals of 0.1 second, the travelable area is calculated in the same manner as described above with reference to FIG. 10 (step S23). In the subsequent step S24, the calculated traveling areas are displayed on the screen of the display 33, for example in the manner shown in FIG. 12. In particular, the area in which the end effector can travel within 0.1 second from the travel starting point S is painted in red, the area to which the end effector can travel in 0.1 to 0.2 second is painted in ocher, the area travelable in 0.2 to 0.3 second is painted in bright yellow, the area travelable in 0.3 to 0.4 second is painted in lemon yellow, the area travelable in 0.4 to 0.5 second is painted in yellow green, the area travelable in 0.5 to 0.6 second is painted in green, the area travelable in 0.6 to 0.7 second is painted in blue green, the area travelable in 0.7 to 0.8 second is painted in light blue, the area travelable in 0.8 to 0.9 second is painted in blue, and so forth. The color tone of travelable area thus gradually changes like a rainbow from red tone to blue tone as the distance from the travel starting point S increases, which will be displayed graphically on the actual screen of the display 33.

Figure 12:
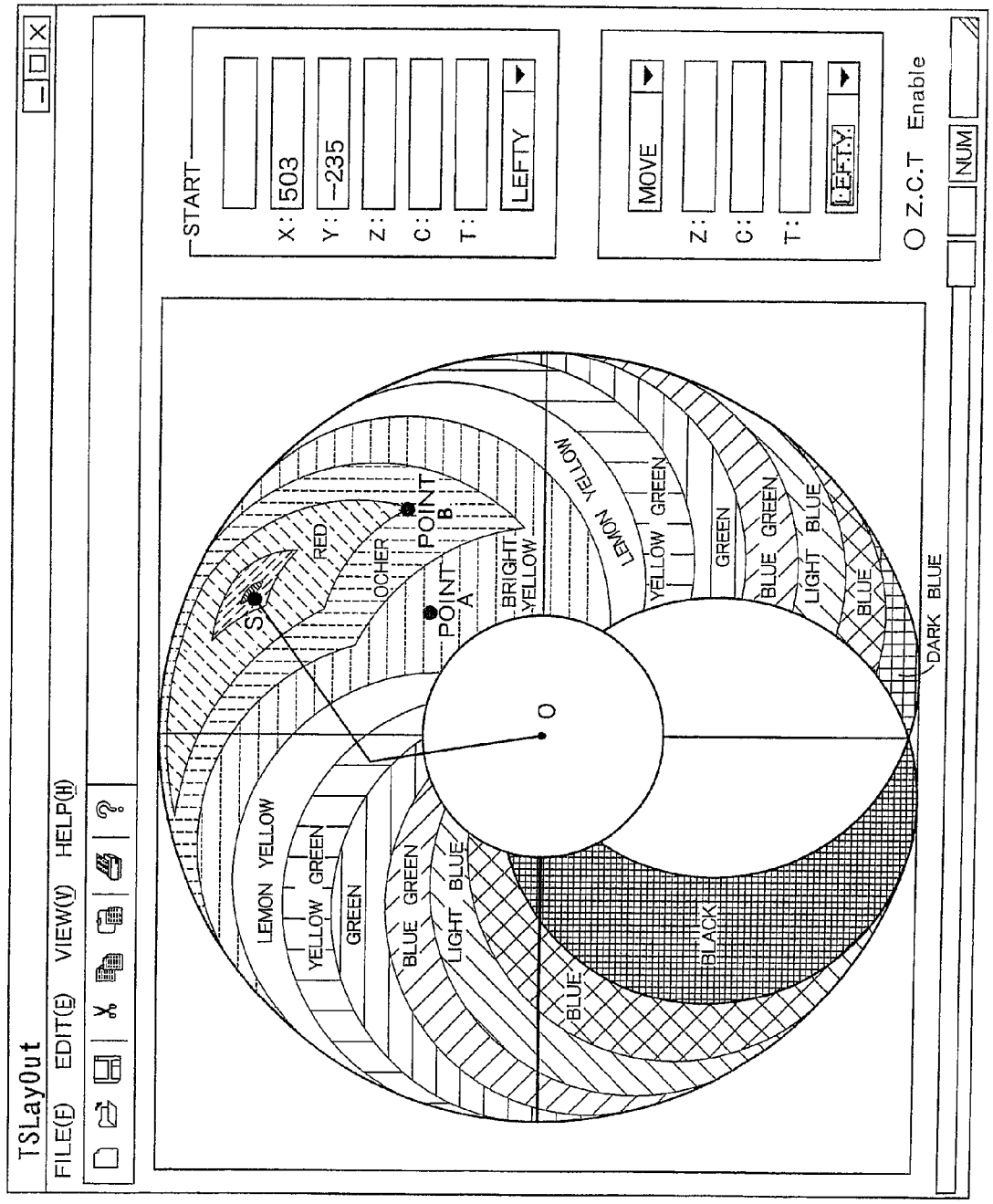
FIG. 12 is a diagram showing a display example of travel time display according to the second embodiment.

Next, in order to designate an objective point on the screen graphically displaying the traveling areas, the cursor is moved to an arbitrary position, for example point A in FIG. 12. By pressing the push-button switch 37, the coordinates of point A as an objective point are read into the central processing unit 30 ("YES" in step S25). The display on the screen is fixed upon the setting of the objective point A (step S26).

Further, upon the designation of the objective point A, the position data is transferred to the robot controller 20 (step S27). The central processing unit 23 issues a command to the motor drive control section 26 in order to move the end effector to the designated objective position A (S28). Accordingly, the robot moves the end effector to the objective position A.

On the other hand, in the case of not setting an objective point in step S25 and returning to step S20 of designating a travel starting point, traveling areas with a different travel starting point will be graphically displayed in a color pattern on the screen following the process of steps S20 to S26.

It is possible, also in this embodiment, to carry out the display calculation processing immediately after taking the coordinates of the present cursor positions in a consecutive manner and dynamically change the display on the screen following the movement of the cursor.

This embodiment, which focuses on the actual operations of the first and second shafts of the robot arm in calculating the traveling area of the end effector, has the following advantage over the first embodiment. When considering, for example, points A and B which are almost equally distant from the travel starting point S, as shown in FIG. 12, it is not readily apparent which point is shorter in terms of travel time without a color-pattern display according to this embodiment. With a color-pattern display according to this embodiment, one can perceive at a glance that point B is shorter in travel time than point A though the both points are equally distant from the travel starting point S.

While the above description illustrates display of travelable areas, which are divided at intervals of a predetermined time, in a manner that visually discriminates the areas by using different hues or tones, any desired display method may be employed insofar as it can visually discriminate travelable areas. For example, it is possible to discriminate travelable areas by brightness of color. Further, travelable areas may be discriminated, not by a chromatic color pattern, but by a pattern or shading of white and black. Furthermore, it is possible to employ an arbitrary combination of tone, shading, pattern, etc. to visually discriminate travelable areas.

Though the above embodiments illustrate the use of a CPU exclusively for display calculation, it is possible to use the CPU of the robot controller also for display calculation if a lowering of display speed is acceptable.

Further, though in the second embodiment data is transferred to the robot controller so as to execute traveling of the robot, it is also possible to employ an independent personal computer as a display device. In that case, instead of cursor position designation by means of a mouse or an arrow key, a flat touch panel-type cursor designation device may also be employed.

What is claimed is:

1. A travel time display device for displaying, by a computer system, time taken for an industrial robot including a robot arm and an end effector mounted to the robot arm to move a work between two points, comprising:

a display for displaying on a display screen a location of the industrial robot and an operation area of the industrial robot, which covers a circular area within a maximum robot arm radius of the industrial robot from which an installation area and a blind area are excluded;

a position designator, configured and arranged to designate a travel starting point of the industrial robot at an arbitrary position within the operation area on the display screen;

a processor, configured to calculate a plurality of divisions at intervals of a predetermined time with respect to necessary travel time from the travel starting point and calculate a travelable area, to be displayed on the display screen, for each of the necessary travel time divisions; and the processor being further configured to provide instructions to the display to depict the travelable areas on the display screen with a visual expression discriminating between the travelable areas.

2. The travel time display device according to claim 1, wherein the processor divides an entire travelable area into unit areas in a grid pattern, calculates travel time of a shortest route from the travel starting point to each unit area for all the unit areas, and makes a decision as to which necessary travel time division each unit area belongs to for all the unit areas, thereby setting unit areas belonging to each necessary travel time division as a travelable area to be displayed.

3. The travel time display device according to claim 2, wherein the processor calculates the travelable areas following movement of the position of the travel starting point on the display screen, and the display depicts the calculated travelable areas dynamically and in real time on the display screen.

4. The travel time display device according to claim 1, wherein the visual expression visually discriminates the travelable areas by any one of hue, tone, brightness of color, shading and pattern or by any combination thereof.

5. The travel time display device according to claim 1, wherein the industrial robot includes a robot arm and at least one pivot shaft for pivoting the robot arm, and wherein the processor calculates the pivoting distance of the robot arm for each said at least one pivot shaft per each necessary travel time division, and specifies an area in which the end effector can travel based on the calculated pivoting distance.

6. A control system for controlling, by a computer system, an industrial robot including a robot arm and an end effector mounted to the robot arm, and a travel time display function, comprising:

a robot control device for controlling the operation of the industrial robot to move the end effector from a starting point and an objective point;

a display for displaying on the screen the location of the industrial robot and an operation area in which the industrial robot can transport a work;

a position designator, configured and arranged to designate a travel starting point and the objective point of the industrial robot at two respective arbitrary positions within the operation area on the display screen;

a processor, configured to calculate a plurality of divisions at intervals of a predetermined time with respect to necessary travel time from the travel starting point and calculate a travelable area, to be displayed on the display screen, for each necessary travel time division;

the processor being further configured to provide instructions to the display to depict the travelable areas on the display screen with a visual expression discriminating between the travelable areas; and a data bus, to transmit data relating to the starting point and the objective point between the robot control device and the processor.

7. The travel time display device according to claim 6, wherein the processor is configured and arranged to divide an entire travelable area into unit areas in a grid pattern, to calculate travel time of a shortest route from the travel starting point to each unit area for all the unit areas, and to make a decision, as to which necessary travel time division each unit area belongs to, for all the unit areas, thereby setting unit areas belonging to each necessary travel time division as a travelable area to be displayed.

8. The travel time display device according to claim 6, wherein the industrial robot includes a robot arm, and at least one pivot shaft for pivoting the robot arm, and wherein the processor calculates the pivoting distance of the robot arm for each said at least one pivot shaft per each necessary travel time division, and specifies an area in which the end effector can travel based on the calculated pivoting distance.

9. The travel time display device according to claim 6, wherein the visual expression visually discriminates the travelable areas by any one of hue, tone, brightness of color, shading and pattern or by any combination thereof.

10. A travel time display method for displaying, by a computer system, time taken for an industrial robot including a robot arm to move a work between two points, comprising:

displaying on a display screen a location of the industrial robot and an operation area of the industrial robot, which covers a circular area within the maximum robot arm radius of the industrial robot from which an installation area and a blind area are excluded;

designating a travel starting point of the industrial robot at an arbitrary position within the operation area on the display screen;

setting a plurality of divisions at intervals of a predetermined time with respect to necessary travel time from the travel starting point and calculating a travelable area, to be displayed on the display screen, for each of the necessary travel time divisions; and depicting the travelable areas on the display screen with a visual. expression discriminating between the travelable areas.

11. A travel time display method as in claim 10, further comprising:

receiving, at a robot control device of the industrial robot, data relating to the starting point and an objective point; and controlling the operation of the industrial robot to move the end effector based on the starting point and the objective point.

12. A computer-readable medium storing a display program for displaying, by a computer system, travel time taken for an industrial robot to move a work between two points, said program executing a computer process comprising:

displaying on a display screen an operation area in which the industrial robot can transport the work;

setting a plurality of divisions at intervals of a predetermined time with respect to necessary travel time from a travel starting point, designated at an arbitrary position within the operation area on the display screen;

calculating a travelable area to be displayed on the display screen for each of the necessary travel time divisions; and depicting the travelable areas on the display screen with a visual expression discriminating between the travelable areas.

* * * * *